(12) United States Patent
McCarville et al.

(10) Patent No.: US 6,861,017 B1
(45) Date of Patent: Mar. 1, 2005

(54) METHOD FOR FORMING COMPOSITE PARTS FROM VOLATILE-EMITTING MATERIALS USING BREATHABLE TOOLING

(75) Inventors: Douglas A. McCarville, Auburn, WA (US); Joseph L. Sweetin, Seattle, WA (US); Irwin Medoff, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 08/758,129

(22) Filed: Nov. 25, 1996

Related U.S. Application Data

(62) Division of application No. 08/468,807, filed on Jun. 6, 1995, now Pat. No. 5,709,893.

(51) Int. Cl.⁷ .............................................. B29C 43/18
(52) U.S. Cl. ..................... 264/39; 264/510; 264/571; 264/102; 264/257; 264/258; 264/325
(58) Field of Search ................................. 264/571, 325, 264/510, DIG. 63, 86, 87, 102, 39, 257, 258

(56) References Cited

U.S. PATENT DOCUMENTS

| | | | |
|---|---|---|---|
| 2,035,190 A | | 3/1936 | Renfrew |
| 3,554,969 A | * | 1/1971 | Long et al. .................... 260/47 |
| 3,666,600 A | | 5/1972 | Yoshino |
| 3,764,449 A | * | 10/1973 | Copeland et al. ............. 161/88 |
| RE28,574 E | * | 10/1975 | Ruoff ........................... 425/78 |
| 4,028,455 A | * | 6/1977 | Ueda et al. .................... 264/89 |
| 4,065,340 A | | 12/1977 | Dickerson |
| 4,146,668 A | * | 3/1979 | Dorey et al. ................ 428/283 |
| 4,165,358 A | * | 8/1979 | Johnson ....................... 264/102 |

(List continued on next page.)

OTHER PUBLICATIONS

D. Stover (ed.), "*Resin–transfer molding for advanced composites,*" Adv. Composite, Mar./Apr. 1990, p. 60–80.

"*Resin transfer molding of composite structures,*" Aero. Eng'g, Dec. 1989, pp. 23–26.

"*More composites in commercial transports,*" Aero. Eng.'g, Dec. 1989, pp. 19–22.

*Primary Examiner*—Edmund H. Lee
(74) *Attorney, Agent, or Firm*—John C. Hammar

(57) ABSTRACT

A method and apparatus for curing composite materials that emit large volumes of volatiles during processing. The apparatus includes tooling having a rigid forming surface contoured to the shape of the formed composite part. A plurality of passages extend from the forming surface through the tooling. The passages are in fluid contact with an exhaust port. A composite workpiece is laid up and placed adjacent the forming surface. The apparatus includes a heater that heats the composite workpiece to temperatures at which volatiles are emitted. An evacuation system draws the volatiles away from the composite workpiece through the passages in the tooling and out of the exhaust port. One embodiment of tooling according to the invention is used to form a sine wave spar. The tooling includes upper and lower tool inserts upon which U-shaped composite channels are formed. The upper and lower tools are placed adjacent to each other to form the web of the spar. Cap strips are placed on either side of the joined U-shaped channels. Side rail tools are then placed adjacent the cap strips. A breather cloth is placed over the tools and the entire assembly is placed within a vacuum bag. The assembly is then placed within an autoclave and connected to the vacuum exhaust of the autoclave. During processing, volatiles are drawn away from the composite workpiece through the passages in the tooling using the vacuum exhaust.

8 Claims, 6 Drawing Sheets

U.S. PATENT DOCUMENTS

| | | | |
|---|---|---|---|
| 4,217,157 A | | 8/1980 | Stoltze et al. |
| 4,311,661 A | | 1/1982 | Palmer |
| 4,336,175 A | * | 6/1982 | Gibbs ..................... 524/726 |
| 4,352,388 A | * | 10/1982 | Perrella ................... 164/305 |
| 4,405,538 A | | 9/1983 | Saidla |
| 4,560,523 A | * | 12/1985 | Plumley et al. ............ 264/102 |
| 4,562,033 A | | 12/1985 | Johnson et al. |
| 4,600,617 A | * | 7/1986 | Cole ......................... 428/64 |
| 4,622,091 A | | 11/1986 | Letterman |
| 4,681,651 A | | 7/1987 | Brozovic et al. |
| 4,740,346 A | | 4/1988 | Freeman |
| 4,755,341 A | | 7/1988 | Reavely et al. |
| 4,782,586 A | | 11/1988 | Joo et al. |
| 4,808,362 A | | 2/1989 | Freeman |
| 4,816,106 A | | 3/1989 | Turris et al. |
| 4,851,280 A | * | 7/1989 | Gupta ....................... 428/246 |
| 4,869,770 A | | 9/1989 | Christensen et al. |
| 4,915,896 A | | 4/1990 | Rachal |
| 4,919,876 A | | 4/1990 | Savage et al. |
| 4,942,013 A | * | 7/1990 | Palmer et al. ............ 264/511 |
| 4,983,341 A | | 1/1991 | Kromrey |
| 4,988,469 A | | 1/1991 | Reavely et al. |
| 5,009,687 A | | 4/1991 | Kromrey |
| 5,045,251 A | | 9/1991 | Johnson |
| 5,059,273 A | | 10/1991 | Boyce et al. |
| 5,102,604 A | | 4/1992 | Sidles et al. |
| 5,106,568 A | * | 4/1992 | Honka ....................... 264/510 |
| 5,116,216 A | | 5/1992 | Cochran et al. |
| 5,134,002 A | | 7/1992 | Vallier |
| 5,151,277 A | | 9/1992 | Bernardon et al. |
| 5,152,949 A | | 10/1992 | Leoni et al. |
| 5,190,094 A | | 3/1993 | Knoess |
| 5,236,646 A | | 8/1993 | Cochran et al. |
| 5,242,651 A | | 9/1993 | Brayden et al. |
| 5,322,661 A | * | 6/1994 | Henrio ...................... 264/510 |
| 5,439,635 A | * | 8/1995 | Seemann .................... 264/510 |
| 5,443,778 A | * | 8/1995 | Schlingman ................ 264/257 |
| 5,518,385 A | * | 5/1996 | Graff ......................... 425/127 |
| 5,589,016 A | * | 12/1996 | Hoopinggarner et al. ... 264/102 |
| 5,686,038 A | * | 11/1997 | Christensen et al. ........ 264/257 |
| 5,709,893 A | * | 1/1998 | McCarville et al. ........ 264/257 |

* cited by examiner

METHOD FOR FORMING COMPOSITE PARTS FROM VOLATILE-EMITTING MATERIALS USING BREATHABLE TOOLING

REFERENCE TO RELATED APPLICATIONS

This application is a divisional application based upon U.S. patent application Ser. No. 08/468,807, filed Jun. 6, 1995, now U.S. Pat. No. 5,709,893.

FIELD OF THE INVENTION

The invention relates to a method and apparatus for forming and curing composite materials, and more particularly to the forming and curing of composite materials that produce large amounts of volatiles during processing.

BACKGROUND OF THE INVENTION

The use of high strength fiber reinforced composite materials in the manufacture of aircraft and other lightweight structures has increased steadily since the introduction of such materials. Composite materials have a high strength-to-weight ratio and stiff-ness. These properties make composite materials attractive for use in the design of lightweight structures. Some of the drawbacks to using composite materials have been their relatively high fabrication costs and low damage tolerance. Generally, it has been difficult to produce parts formed of high strength composite materials at the same cost and having the same damage tolerance as comparable metal parts. Another disadvantage of composite materials in some applications is their relatively low temperature tolerance. Most widely used high-strength fiber reinforced composite materials are not usable above 300° F.

Recent research has focused on the development of composite materials with increased damage tolerance that can withstand higher temperatures. A number of promising composite materials use toughened epoxy or thermoplastic matrix systems. In addition to having increased damage tolerance, a number of these promising materials can withstand higher temperature environments than past thermoset materials. For example, a number of promising materials, including DuPont's K-IIIB™, G.E.'s ULTEM™, and ICI's APC-HTA™ have glass transition temperatures in the range of 400° F. to 500° F., as compared to past epoxy-based composites glass transition temperatures in the 300° F. range.

Although new composite systems have increased damage tolerance and can withstand higher temperatures, they require more stringent processing parameters. Some of these new composite materials must be processed at temperatures in the 600–800° F. range and at pressures of 100–300 psi. In addition, several of the new composite systems emit large quantities of gaseous volatiles during processing. For example, DuPont's Avimid K-IIIB thermoplastic ("K-IIIB") material emits gaseous volatiles including water vapor, ethanol gas, and N-Methyl peryladone ("NMP") during processing.

FIG. 1 is a graphical representation of the gaseous volatiles emitted from K-IIIB during processing. In FIG. 1, both weight loss and derivative weight are plotted along the x-axis, and temperature is plotted along the y-axis. As illustrated, a large quantity of water, ethanol, and NMP are emitted as the temperature increases during the processing cycle. The majority of the NMP is released before the time the temperature reaches approximately 600° F. The majority of the water and ethanol within the K-IIIB is released before the material reaches approximately 800° F.

The high temperatures and pressures required for processing and the off-gassing of volatiles increases the difficulty in processing the new materials. In order to produce quality void-free parts, it is necessary to draw off the volatiles during curing. Failure to draw off the volatiles during processing results in voids or areas of porosity in the formed composite parts.

Past methods used to draw off volatiles limit the ability to fabricate complex parts from volatile-producing materials. Currently, parts formed of volatile-producing materials are fabricated by laying up the material on the forming surface of a shaped mandrel. The forming surface of the mandrel has the contour of the completed part. A porous cloth breathing material is placed on the side of the composite material opposite the forming surface. The tool, composite material and cloth breathing material are enclosed within a sealed vacuum bag and placed in an autoclave. As the temperature of the tool and composite material are elevated, gaseous volatiles are emitted. These volatiles are drawn away from the composite material through the cloth breathing material and out through the vacuum bag.

The use of cloth breathing materials allows quality parts to be fabricated when access is available to at least one side of the composite material during processing. Access to one or more sides of the composite material is generally available only when it is not necessary to maintain dimensional tolerances on more than one side of the part fabricated. However, if dimensional tolerances must be maintained throughout the part, it is generally not possible to use a cloth breathing material adjacent the composite material during processing.

In complex parts or parts requiring tight dimensional tolerances, matched tooling is generally used. When matched tooling is used, tools having rigid forming surfaces are placed in contact with most or all of the surfaces of the composite material during processing. The dimensional tolerances of the formed part are determined by the shape of the forming surfaces on the tools.

For example, matched rigid tooling is generally used in the fabrication of I-beam and sine wave spars. The dimensional tolerances on both the top and bottom caps of such spars must be maintained, thus requiring the use of rigid matched tooling. Tooling having rigid forming surfaces are also used to form the webs of the spars to ensure proper consolidation of the composite material. When rigid matched tooling is used, volatiles emitted become trapped within the composite material during processing. These trapped volatiles create voids and areas of porosity in the completed part.

In an attempt to withdraw volatiles when using matched tooling, the inventors placed cloth breathing materials between the composite material and the rigid forming surface of the tooling. The use of cloth breathing materials between the tool and the composite material created a number of problems. The cloth breathing material made it difficult, and in most circumstances impossible, to control dimensional tolerances on the surfaces of the formed composite part. The use of cloth breathing materials also inhibited the matched tooling from closing or created pressure variations within the tooling during processing. The cloth breathing materials also became pinched off or were filled with resin during processing, producing pressure variations. Such pressure variations resulted in resin-rich, resin-poor, or porous regions within the formed composite part.

As can be seen from the above discussion, there exists a need for an improved method and apparatus for forming and curing volatile producing composite materials. The present invention is directed toward fulfilling this need.

SUMMARY OF THE INVENTION

The present invention is a method and apparatus for forming composite parts from composite materials that produce large volumes of volatiles during processing. The invention allows volatiles to be drawn away from the composite material during processing, while allowing dimensional tolerances to be maintained.

In one embodiment of a method according to the invention, volatile producing composite materials are laid up to form a composite workpiece. The composite workpiece is placed adjacent a tool having a rigid forming surface. A plurality of passages extend from the forming surface through the tool. The passages are in fluid contact with an exhaust port. After being placed adjacent the forming surface, the composite workpiece is heated to a temperature at which volatiles are emitted. These volatiles are removed from the composite workpiece through the passages and the exhaust port.

In accordance with other features of the invention, the passages in the tool may be formed by mechanically drilling, laser drilling or otherwise forming passages in the structure of the tool. Alternatively, the passages may be formed by forming the tool of a porous material. In one embodiment of the invention, the tool is formed of porous graphite or a sintered metal.

In one apparatus according to the invention, a tool having a rigid forming surface is provided. The tool includes a plurality of passages extending from the forming surface through the tool. The passages are in fluid contact with an exhaust port. A composite workpiece is placed adjacent the forming surface. The apparatus also includes a heat source that heats the composite workpiece to a temperature at which volatiles are emitted. The volatiles are removed from the composite workpiece through the use of an evacuation system that draws the volatiles through the passages and out of the exhaust port.

In accordance with other aspects of the invention, the passages have a diameter of between approximately 0.040" and 0.062". The tools can be formed of a gas impermeable rigid material having a plurality of passages formed by drilling, chemical etching, etc. Alternately, the tools can be formed of a rigid, porous material that allows gaseous volatiles to pass through the passages within the porous material.

In accordance with still further aspects of the invention, the tools are hollow. The passages extend from the forming surface of the tool into a cavity within the hollow tool. The cavity is filled with a porous breather material.

In accordance with still other aspects of the invention, the composite material and tools are covered by a cloth breather material and are enclosed within a vacuum bag. The volatiles are withdrawn through the passages in the tool, through the breather material and out through the exhaust port.

The invention allows high-quality composite parts to be formed of composite materials that emit a large volume of volatiles during processing. The invention is not limited to composite parts having simple geometries. Nor is the invention limited to the formation of composite materials in which dimensional tolerances on only one surface of the composite part are important. The invention may be used with autoclave, press or other methods of processing.

BRIEF DESCRIPTION OF THE DRAWINGS

The foregoing aspects and many of the attendant advantages of the invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a method and apparatus to form and cure composite materials that produce large quantities of volatiles during processing. The invention is described below with respect to a preferred embodiment used to form a sine wave spar. However, the method and apparatus of the invention may be used to form a wide variety of composite structures. The preferred embodiment is also described with respect to the use of DuPont's K-IIIB material system. However, the invention may be used with other composite material systems.

Figure 1:
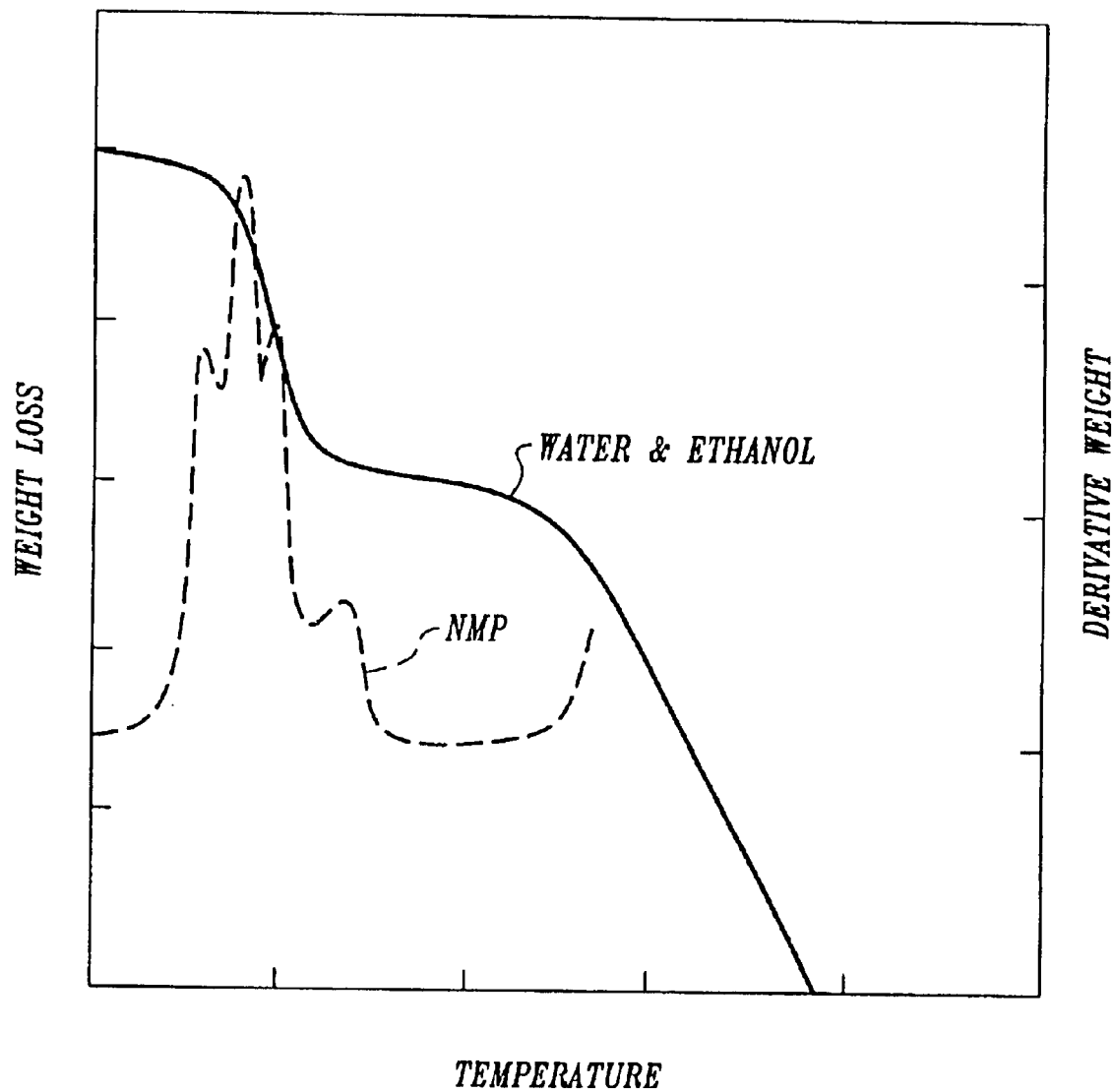
FIG. 1 is a graph of volatiles produced as a function of temperature, wherein weight loss and derivative weight are plotted along the y-axis and temperature is plotted along the x-axis.
Figure 2:
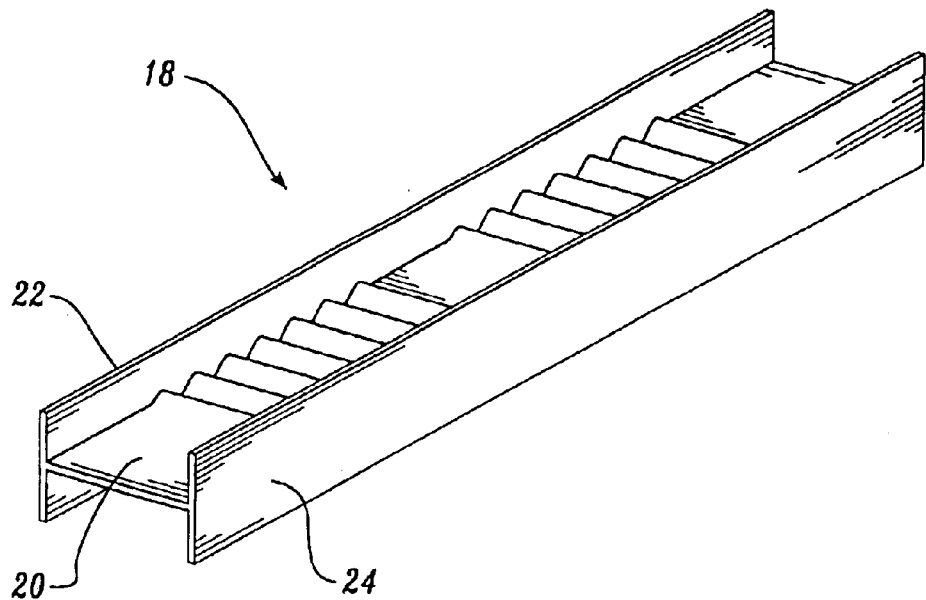
FIG. 2 is a perspective view of a sine wave spar formed in accordance with a method of the invention.

FIG. 2 illustrates a sine wave spar 18 fabricated using a breathable tooling concept (FIG. 3) according to the invention. As best illustrated in FIG. 2, the sine wave spar 18 is an I-beam having a sine wave central web 20 that extends between left and right spar caps 22 and 24, respectively.

In the preferred embodiment, it is important to maintain dimensional tolerances on the surfaces of the spar caps 22 and 24 and central web 20. In order to maintain such tolerances, tooling having rigid forming surfaces are used. As described below, the rigid forming surfaces are placed adjacent the composite material and define the dimensions of the sine wave spar 18.

The sine wave spar 18 is fabricated using preformed subassemblies that are joined together in an assembly process to form a composite workpiece. In the preferred embodiment, the subassemblies used to form the composite workpiece include lower and upper U-shaped channels 36 and 38 (FIG. 4), left and right radius fillers 40 and 42, and left and right cap strips 44 and 46.

Figure 4:
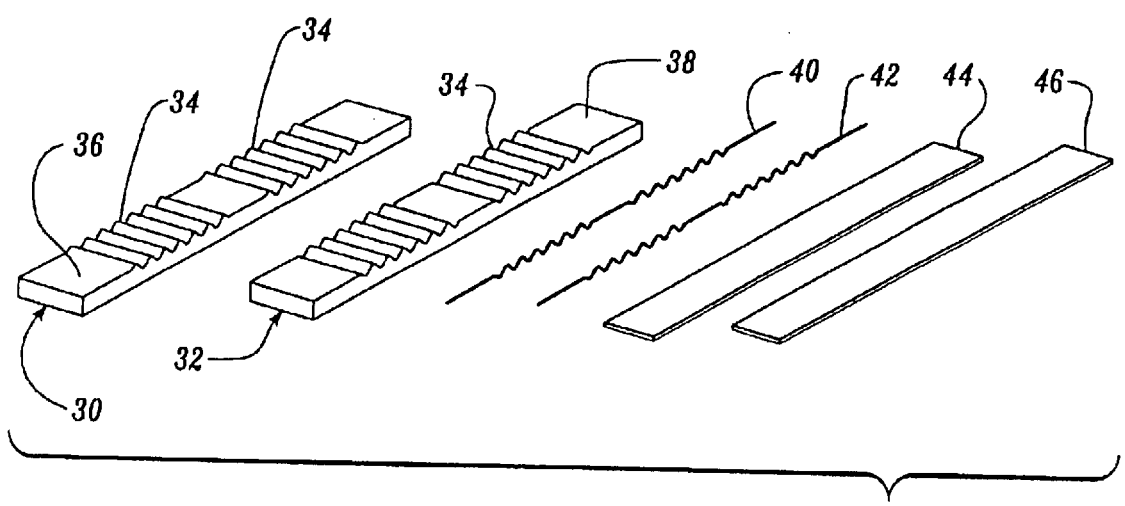
FIG. 4 is a perspective view of the upper and lower tool inserts and composite subassemblies used to form the sine wave spar.

The lower and upper U-shaped channels 36 and 38 are formed by laying up composite material over lower and upper 30 and 32 rigid tool inserts (FIG. 4). Each tool insert 30 and 32 is generally rectangular and includes a rigid forming surface having a sine wave contour 34. The composite material is laid up on the forming surfaces so that it follows the sine wave contour 34 and bends over the opposing edges of the tool inserts to form the lower and upper U-shaped channels 36 and 38. The composite material may be placed on the tool inserts 30 and 32 using hand lay-up procedures, automated tape laying, or other fabrication methods.

The left and right cap strips 44 and 46 (FIG. 4) are formed by laying up strips of composite material on a flat surface. The strips may be laid up by hand, using an automated tape laying machine, or using other fabrication methods. The left and right radius fillers 40 and 42 are formed by hand lay-up, pultrusion, or other fabrication methods. Methods for laying up composite materials over tools and for fabricating radius fillers are well known by those of ordinary skill in the art.

Figure 5:
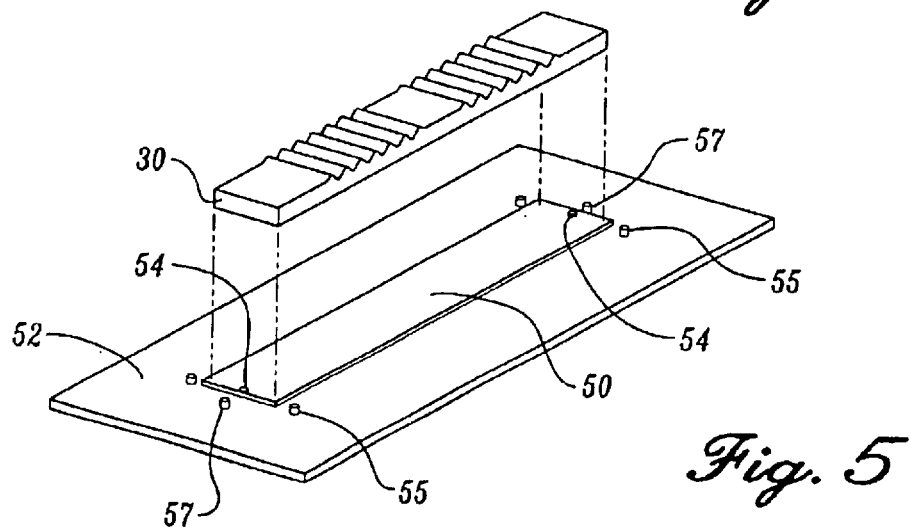
FIG. 5 is a partially exploded view of the lower tool insert and base plate.

After the lower and upper U-shaped channels 36 and 38 are fabricated, the lower tool insert 30 is placed on a flat gage sheet 50 (FIG. 5). The gage sheet 50 is mounted on a rigid rectangular base plate 52. The base plate 52 has a larger surface area than the gage sheet 50 and supports the sine wave spar tooling during processing, as described below.

Figure 6:
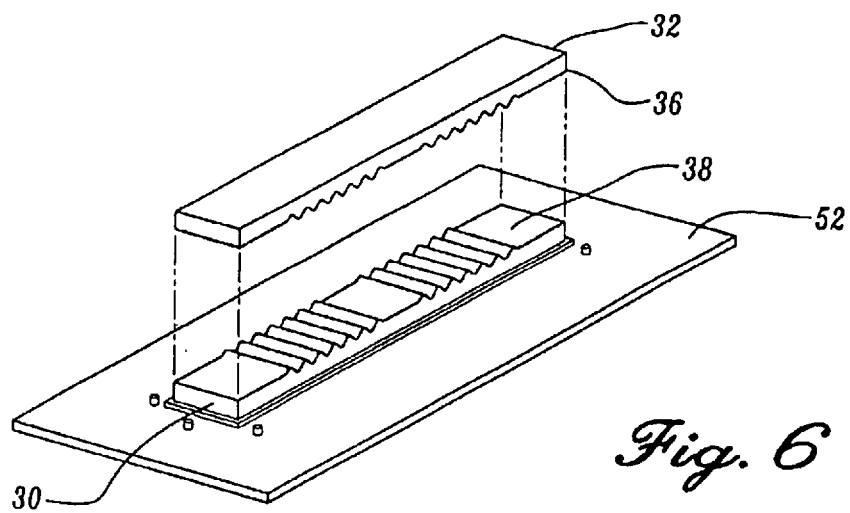
FIG. 6 is a partially exploded view of the upper and lower tool inserts and base plate.

The lower tool insert 30 is indexed in a predetermined location on the gage sheet 50 and base plate 52 using a plurality of indexing pins 54 (FIG. 5) in a manner well known in the art. The indexing pins 54 extend upward from the surface of the base plate 52 and engage recesses (not shown) in the lower surface of the lower tool insert 30. After the lower tool insert 30 is indexed, the upper tool insert 32 is inverted and placed on top of the lower tool insert 30 and aligned (FIG. 6) in a manner well known in the art. For example, indexing pins (not shown) extending upward from the lower tool insert 30 can engage recesses (not shown) in the upper tool insert 32.

Figure 7:
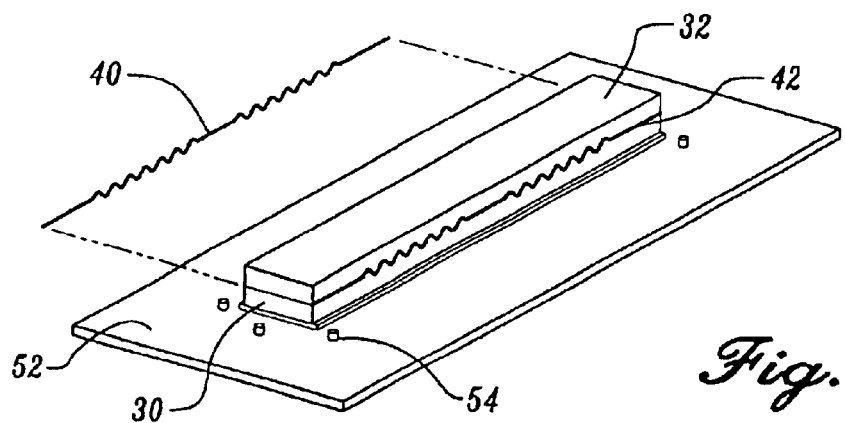
FIG. 7 is a partially exploded view of the upper and lower tool inserts and radius fillers.
Figure 8:
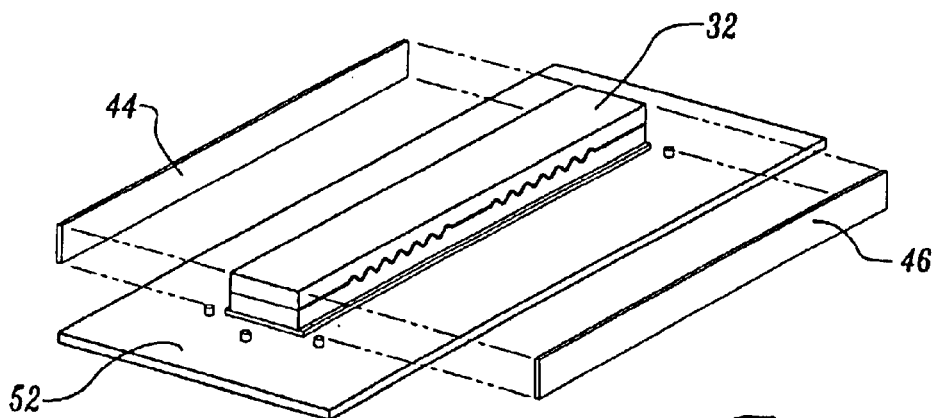
FIG. 8 is a partially exploded view of the upper and lower tool inserts and cap strips.

As the lower and upper tool inserts 30 and 32 are aligned, the lower and upper U-shaped channels 36 and 38 are placed in contact with each other, forming the central web 20 (FIG. 2) of the sine wave spar 18. Due to rounded edges on the lower and upper tool inserts 30 and 32, a triangular gap is formed between the intersection of the lower and upper U-shaped channels 36 and 38. These triangular gaps are filled using left and right radius fillers 40 and 42, respectively (FIG. 7). The radius fillers 40 and 42 are placed in the triangular gaps and secured using a heat gun or another method as known by those of ordinary skill in the art. After the radius fillers 40 and 42 are in place, tfhe left and right cap strips 44 and 46 are placed in contact with the sides of the U-shaped channels 36 and 38 and radius fillers 40 and 42 (FIG. 8).

Left and right side rail tools 60' and 62 (FIG. 9) having rigid forming surfaces are then placed adjacent the left and right cap strips 44 and 46. The left and right side rail tools rest upon the base plate 52. The rigid forming surfaces of the side rail tools 60 and 62 define the dimensions of the exterior surfaces of the left and right spar caps 22 and 24 (FIG. 2).

Depending upon the application, the left and right side rail tools 60 and 62 may be allowed to float, i.e., move in and out toward and away from the upper and lower tool inserts 30 and 32 during processing as described below. Alternately, the left and right side rail tools 60 and 62 may be indexed into a predetermined position by indexing pins 55 (FIG. 9) extending upward from the base plate 52. The indexing pins 55 are received within recesses (not shown) in the lower surface of the side rail tools 60 and 62.

Figure 9:
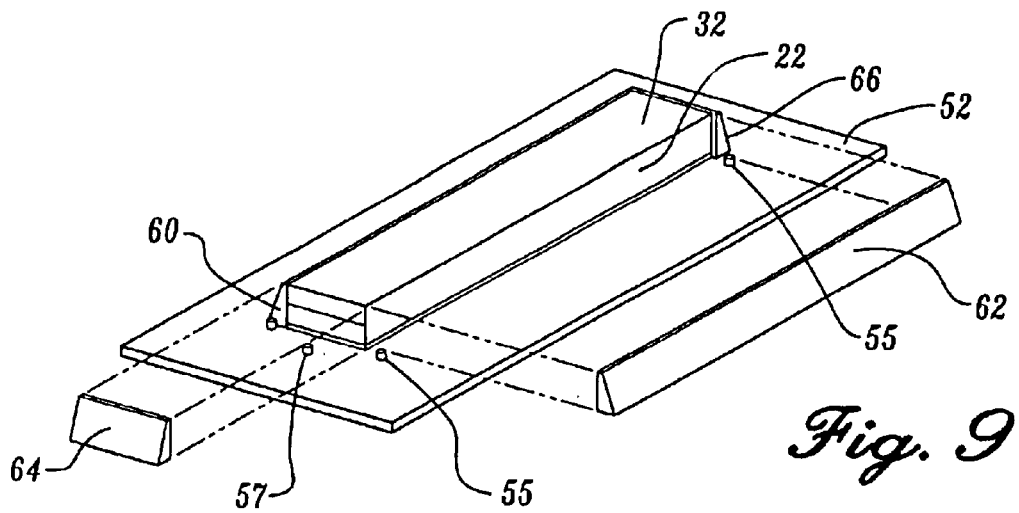
FIG. 9 is a partially exploded view of the upper and lower tool inserts and side rail tools.

After the side rail tools 60 and 62 are in place, end tools 64 and 66 are placed on the opposing ends of the lower and upper tool inserts 30 and 32 (FIG. 9). The end tools 64 and 66 have rigid forming surfaces that help to define the opposing ends of the sine wave spar. The end tools 64 and 66 are indexed in place by indexing pins 57 that extend upward from the base plate 52. The indexing pins 57 engage recesses (not shown) in the lower surface of the end tools 64 and 66.

In alternate embodiments of the invention, other tooling concepts could be used to fabricate the sine wave spar 18. For example, the configuration of the tools or the arrangement of the indexing pins could be changed. Different tooling concepts and methods of indexing tools are readily understood by those of ordinary skill in the art.

Figure 10:
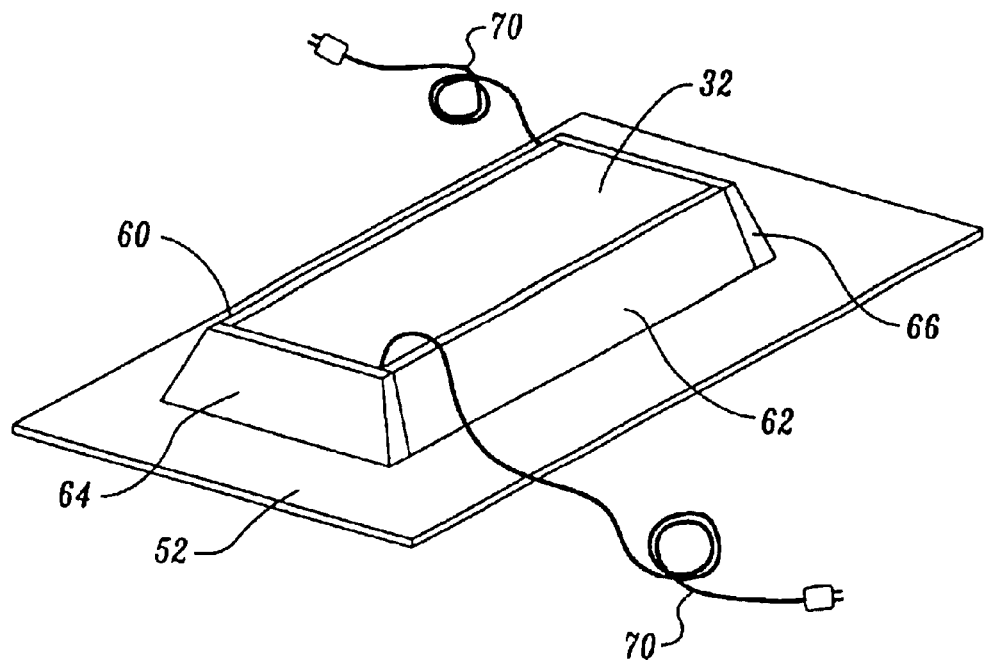
FIG. 10 is a perspective view of the assembled sine wave spar tooling.

As illustrated in FIG. 10, the lower and upper tool inserts 30 and 32, side rail tools 60 and 62, and end tools 64 and 66 surround the composite material forming the sine wave spar 18. The rigid forming surfaces of the tools define the dimension of the formed spar. To monitor the processing parameters, one or more thermocouples 70 can be incorporated in the composite material or tools. The thermocouples 70 can be connected to appropriate monitoring equipment to monitor the temperature of the tools or composite material during processing.

Figure 3:
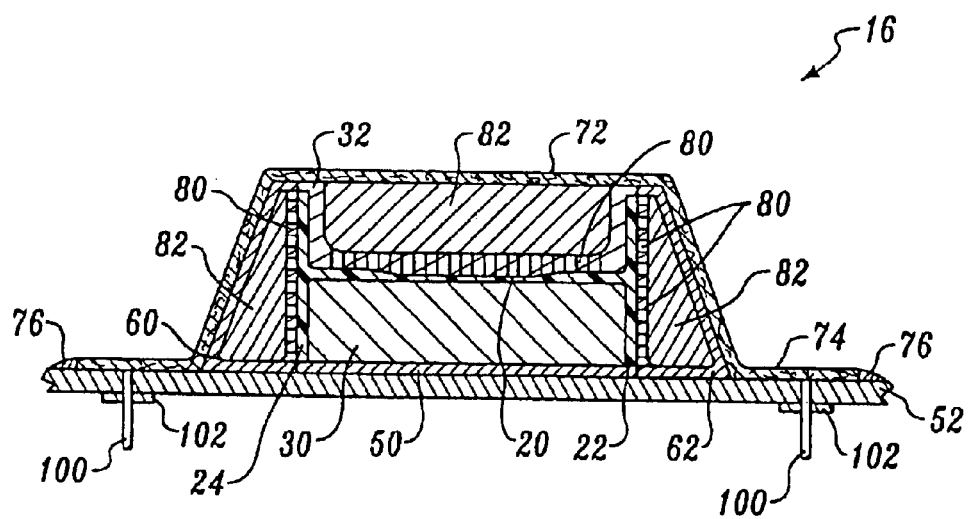
FIG. 3 is a cross-sectional view of sine wave spar tooling formed in accordance with the invention.
Figure 11:
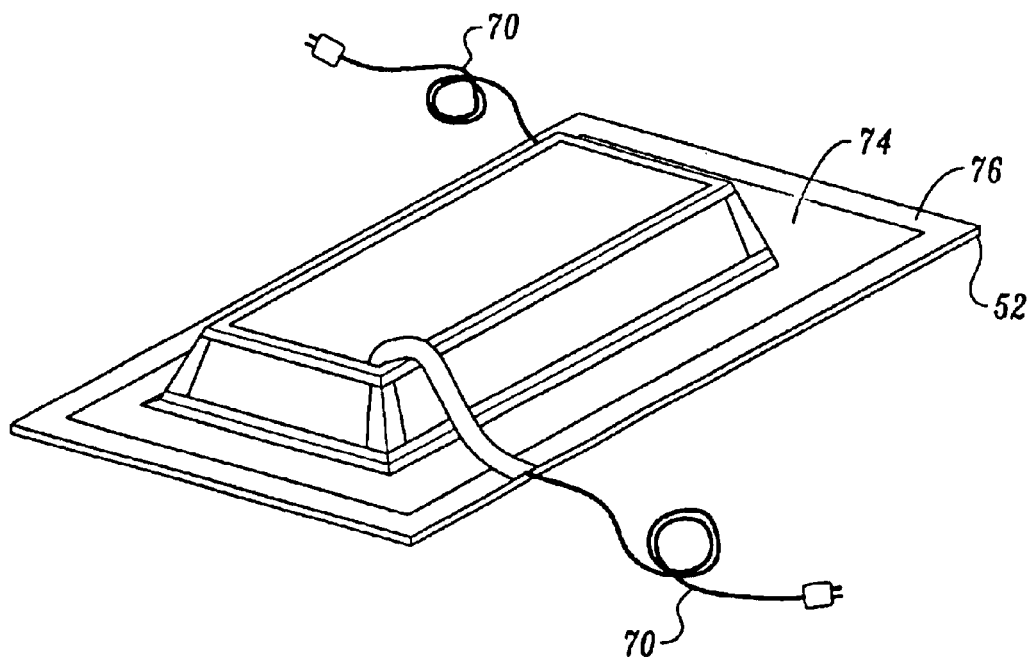
FIG. 11 is a perspective view of the sine wave spar tooling after bagging.

As illustrated in FIG. 3, after the tooling is in place, it is covered by a cloth breather material 72. The cloth breather material 72 partially covers the surface of the base plate 52 and extends over the top of the left and right side rail tools 60 and 62, end tools 64 and 66, and upper tool insert 30. A vacuum bag 74 (FIGS. 3 and 11) is then placed over the top of the cloth breather material 72 and sealed to the base plate 52 along its edges 76 in a manner well known in the art.

As discussed in the background section, it is important when processing volatile producing composite materials to allow a pathway for the volatiles to be withdrawn. In accordance with the present invention, one or more of the tools are formed with passages that allow gaseous volatiles to pass through the tools during processing. The gaseous volatiles are then withdrawn out of the vacuum bag as described below.

In the preferred embodiment, both the upper tool insert 32 and the left and right side rail tools 60 and 62 include a plurality of holes or passages 80 (FIG. 3). The passages 80 extend from the forming surfaces of the upper tool insert 32 and side rail tools 60 and 62 through the thickness of the tools.

The upper tool insert 32 is U-shaped and includes a U-shaped cavity in its upper surface. The cavity is filled with a porous breather material 82 (FIG. 3). The left and right side rail tools 60 and 62 are hollow and are also filled with porous breather material 82. The porous breather material 82 can be any material that allows gaseous volatiles to pass through the material while withstanding the high temperatures and pressures placed on the tooling during processing. In the preferred embodiment, the porous breather material 82 is formed of fiberglass breather cloth.

In the preferred embodiment, the upper tool insert is formed with a U-shaped cavity and the side rail tools 60 and 62 are hollowed out in order to decrease the weight and costs of the tools. Generally, porous materials suitable for use as breather materials 82 are less dense and thus lighter weight than the materials from which the tools are fabricated. Such breather materials 82 are also generally less expensive than the materials used to form the tools. In some applications, the tools can be large and quite heavy. Thus, there are advantages to using rigid tools filled with lighter weight breather materials as described above.

In alternate embodiments of the invention, solid tools could be used. In such embodiments, the passages 80 can pass through the entire thickness of the tool. In such applications, the passages through the tools would provide a path through which the gaseous volatiles could pass through the tools into the cloth breather material 72.

In the preferred embodiment, the tools 30, 32, 60 and 62 are formed of Invar 42. Invar 42 is preferred because it has a coefficient of thermal expansion compatible with many high temperature composite materials. However, in alternate embodiments, the tools may be formed of other suitable materials including other metals, ceramics or composites.

In the preferred embodiment, the passages 80 are formed by mechanically drilling holes through the thickness of the tools. However, laser drilling, chemical etching, casting, or other methods could be used to form the passages.

The passages 80 extend through the thickness of the tools 32, 60 and 62, approximately normal to the rigid forming surfaces of the tools. The passages 80 allow gaseous volatiles emitted during processing to flow into the porous breather material. The porous breather material 82 in turn allows the gaseous volatiles to flow into the cloth breather material 72 covering the tools.

The cloth breather material 72 may be placed in direct contact with the breather material 82 (FIG. 3), as in the case of the breather material in the upper tool insert 32. Alternately, as in the case of the side rail tools 60 and 62, passages may be drilled through the sides of the tools to allow gases to pass out of the breather material 82, through the tool, and into the cloth breather material 72.

The gaseous volatiles are withdrawn out of the cloth breather material 72 and vacuum bag 74 through exhaust ports 100. The exhaust ports 100 are located on the left and right sides of the left and right side rail tools 60 and 62 (FIG. 3). The exhaust ports 100 extend through the thickness of the base plate 52 and open into the vacuum bag 74 underneath the cloth breather material 72. The periphery of each exhaust port 100 is sealed by a seal 102 in a manner well-known in the art.

In the preferred embodiment, the vacuum bagged tooling assembly 16 (FIGS. 3 and 11) is placed within an autoclave (not shown) and the exhaust ports 100 are attached to the vacuum exhaust (not shown) of the autoclave. The autoclave is then closed and the interior of the autoclave is pressurized and heated in accordance with the processing requirements of the composite material used.

During processing, a vacuum is placed on the exhaust ports 100 to evacuate the interior of the vacuum bag 74. The vacuum may be placed on the exhaust ports through the use of any appropriate vacuum device such as the vacuum pump within the autoclave. The combined pressure produced by the evacuation of the vacuum bag 74 and the pressurization of the autoclave presses the upper tool insert 32 downward and the side rail tools 60 and 62 inward. As the tools are pressed downward and inward, the rigid forming surfaces of the tools consolidate the composite material.

As the temperature of the composite material is elevated, gaseous volatiles are emitted. The gaseous volatiles flow through the passages 80 in the tools 32, 60 and 62 into the breather material 82. The gaseous volatiles then flow through the breather material 82 into the cloth breather material 72. The gaseous volatiles are then withdrawn from the vacuum bag 74 and cloth breather 72 through the exhaust ports 100.

Although the preferred embodiment of the invention is described with respect to the use of an autoclave, other apparatus could be used to process the composite material. For example, the tooling assembly 16 could be heated through the use of heating elements embedded within the tools, inductive heating, or through the use of other heating methods and apparatus. Similarly, although in the preferred embodiment, an autoclave is used to apply a consolidation pressure to the composite workpiece, a mechanical apparatus such as a press could also be used.

The number of, diameter and spacing of the passages 80 is a function of several variables, including the composite material used, the quality of the surface finish desired, ease of cleaning desired, and cost. Increasing the number of passages used increases the associated fabrication costs. Using passages with greater diameters makes it easier to clean the passages of any obstructions caused by resin flowing into and blocking the passages. However, increasing the diameter of the passages also allows more resin to flow into the passages, thus possibly resulting in a markoff that detracts from the surface finish of the formed part. The size and number of passages used is also directly related to the quantity of volatiles produced by the composite material during processing. Composite materials that produce larger volumes of volatiles require a higher percentage of the surface area to be taken up by passages to remove the volatiles.

In the preferred embodiment, DuPont's K-IIIB material system was used to fabricate the sine wave spar 18. Based on results using the K-IIIB material system, it was found most advantageous for the percentage of open area containing passages to the overall tool forming surface area to be approximately 1.44%. However, the percent open area is influenced by a number of factors including the material system used. Therefore, in other embodiments, the percentage of open area used could change.

It was also found that passages 80 having diameters between approximately 0.046" and 0.062" are most advantageous. Passages 80 having diameters larger than approximately 0.062" produced unacceptable markoff on the cured part's surface finish. Passages 80 with diameters below approximately 0.046" were found to be too difficult to clean after processing. The small diameter of such passages prevented cured resin that flowed into the passages during processing from being easily removed.

As composite materials pre processed, there is a tendency for some resin to enter the interior of the passages 80. In some cases, the resin cures within the passages and blocks or obstructs the flow of gaseous volatiles through the passages. Therefore, it is important that the passages 80 be inspected and cleaned after a part is fabricated. The passages 80 can be cleaned using solvents, mechanical cleaning means, high pressure air systems, etc. Problems created by resin flowing into the passages can be minimized by properly tailoring the diameter and distribution of the passages. The passages should allow uninhibited volatile evolution while keeping resin bleed to a minimum.

Although the preferred embodiment of the invention uses tools formed of Invar 42, tools formed of other materials may also be used. In some applications, tools formed of ceramics, monolithic graphite, composite materials, sintered bronze or copper, or other materials may be used. In addition, although the passages 80 in the preferred embodiment are formed by drilling, boring, etc., the passages could also be formed by other means. For example, the passages could be formed integrally within the tools by casting, or by forming the tools of porous material such as a sintered metal, monolithic graphite or a porous ceramic.

Figure 12:
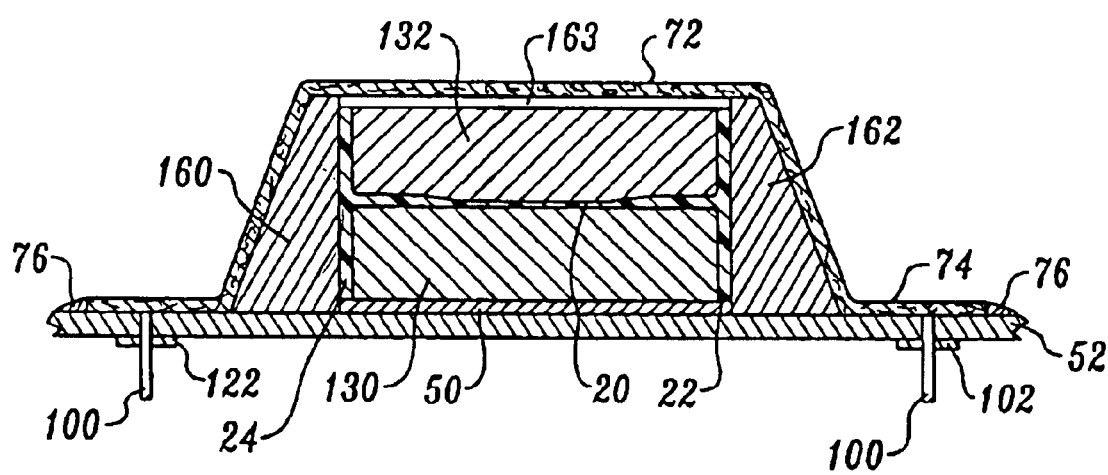
FIG. 12 is a cross-sectional view of another embodiment of sine wave spar tooling according to the invention.

FIG. 12 illustrates the use of tooling formed of monolithic graphite. In FIG. 12, the monolithic graphite tooling is configured in the same tooling concept as that described with respect to the Invar 42 tooling of the preferred embodiment described above. The tooling concept and vacuum bagging and curing are similar to that described above with respect to the preferred embodiment and may be understood by reference to the discussion of the preferred embodiment.

The monolithic graphite tooling includes lower and upper tool inserts 130 and 132, and left and right side rail tools 160 and 162. The upper and lower tool inserts and left and right side rail tools are configured in a manner similar to that described above with respect to the preferred embodiment. Composite materials are laid up over the lower and upper 130 and 132 tool inserts. The tool inserts are then assembled to form the web 22 of the sine wave spar. In a manner similar to that described above with respect to the preferred embodiment, radius fillers and cap strips are laid up and assembled to form the left and right sine wave spar caps 22 and 24.

The left and right side rail tools 160 and 162 are then placed on the base plate 152 adjacent the spar caps 22 and 24. A gage plate 163 is then placed over the top of the upper tool insert 132. A cloth breather material 72 and vacuum bag 74 are then placed over the top of the tools. The vacuum bag 74 is sealed around its periphery edges 76 in a manner similar to that described above with respect to the preferred embodiment. The vacuum bagged graphite tooling assembly is then placed within an autoclave and processed in accordance with the processing parameters of the composite material used.

During processing, the gaseous volatiles produced by the composite material pass through the thickness of the monolithic graphite tools into the breather cloth 72. The gaseous volatiles are then withdrawn out of the breather cloth 72 and vacuum bag 74 through the exhaust ports 100 in a manner similar to that described above with respect to the preferred embodiment.

Monolithic graphite tooling is advantageous in some applications due to its lower cost versus comparable drilled Invar 42 tooling. However, monolithic graphite tooling is more brittle and is thus more prone to damage in a limited number of processing cycles. Due to its brittle nature, monolithic graphite tooling is advantageously used in applications where a limited number of parts are produced.

Unlike the drilled Invar 42 tooling described above, monolithic graphite tooling is porous by nature. The porosity of the monolithic graphite tooling allows gaseous volatiles produced by the composite material to migrate through the natural passages in the tooling. In addition to its brittle nature, the use of monolithic graphite tooling is limited by the porosity within the tooling. During each processing cycle, some resin enters the monolithic graphite tooling blocking the passages within the tooling. Over time, a sufficient quantity of the passages become blocked to prevent the flow of gaseous volatiles through the tooling. Thus, monolithic graphite tooling may be used for a limited number of processing cycles.

The present invention allows complex parts to be formed from composite materials that produce large quantities of, volatiles. The rigid forming surfaces of the tooling of the invention allow part tolerances be tightly maintained while the passages through the tooling allow gaseous volatiles emitted during processing to be removed.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for forming a part from a composite material containing a resin that emits volatiles during processing, comprising the steps of:

laying up the composite material on a rigid forming surface of a mold tool to form a composite workpiece, the tool maintaining dimensional tolerances and having a plurality of volatile-egress passages that are in fluid contact with an exhaust port, overlie substantially the entire surface of the workpiece, and-extend from the forming surface of the tool through the tool to allow volatiles emitted from the workpiece to vent from the tooling through the exhaust port;

heating the workpiece to a temperature at which the composite material emits volatiles to cure the resin on the surface to form the part;

removing the volatiles, while the resin is curing, through the passages and the exhaust port;

removing the part from the tool; and after removing the part, cleaning the passages in the tool to remove resin that enters and blocks or obstructs the passages during removing the volatiles.

2. The method of claim 1, further comprising the step of applying a consolidation force on the workpiece through a matching tool operatively associated with the mold tool while heating the workpiece.

3. The method of claim 1, further comprising placing a cloth breather material and vacuum bag over the workpiece, prior to heating the workpiece, the cloth breather material being positioned to direct the emitted volatiles to the exhaust port.

4. The method of claim 1 further comprising forming the tool from a rigid porous material.

5. The method of claim 1 wherein the composite material is a prepreg having reinforcing fibers impregnated with a thermoplastic resin, and wherein The volatiles include a solvent used for applying the thermoplastic resin to the reinforced fibers.

6. The method of claim 1 further comprising the step of backing the forming surface of the tool with a porous breather lower-density material than the tool between the tool and the exhaust port to reduce the mass of the tool.

7. The method of claim 1 wherein the open area of all the passages is approximately 1.44% of the total area of the forming surface and the passages are sized to keep resin bleed from the workpiece to a minimum.

8. A method for forming a part on a mold tool, having a rigid forming surface defining an overall forming surface area, from a composite material that emits volatiles during processing, comprising the steps of:

laying up a volatile-emitting, fiber-reinforced thermoplastic resin prepreg on a rigid forming surface of the mold tool to form a composite workpiece, the tool maintaining dimensional tolerances and having a plurality of passages that overlie substantially the entire surface of the workpiece and that extend from the forming surface through the tool, the passages being in fluid contact with an exhaust port and allowing the egress of volatiles from the workpiece through the tool when forming the part by curing the resin, wherein the percentage of open area containing the passages to the overall forming surface area is approximately 1.44%, the tool also having a backing behind the forming surface comprising a porous breather material that functions to connect the passages in the tool with the exhaust port to reduce the mass of the tool;

placing a cloth breather material over the tool and the composite workpiece in contact with the passages and placing a vacuum bag around the cloth breather material, wherein the breather material directs the volatiles to the exhaust port;

placing a consolidation force on the composite workpiece;

heating the composite workpiece, while maintaining the consolidation force, to a temperature at which the composite material emits volatiles to cure the resin; and removing the emitted volatiles through the passages, porous breather, and the exhaust port.

\* \* \* \* \*